(12) United States Patent
Ando et al.

(10) Patent No.: US 7,544,131 B2
(45) Date of Patent: Jun. 9, 2009

(54) TRIPOD-TYPE CONSTANT VELOCITY JOINT

(75) Inventors: Atsushi Ando, Kariya (JP); Minoru Wakamatsu, Kariya (JP); Kazuyuki Ichikawa, Okazaki (JP); Isashi Kashiwagi, Kariya (JP)

(73) Assignee: Yoyoda Koki Kabuhsiki Kaisha, Kariya-shi (JP)

( * ) Notice: Subject to any disclaimer, the term of this patent is extended or adjusted under 35 U.S.C. 154(b) by 543 days.

(21) Appl. No.: 11/234,199

(22) Filed: Sep. 26, 2005

(65) Prior Publication Data

US 2006/0079336 A1 Apr. 13, 2006

(30) Foreign Application Priority Data

Oct. 13, 2004 (JP) .............................. 2004-299425

(51) Int. Cl.
*F16D 3/26* (2006.01)
(52) U.S. Cl. ....................... 464/111; 464/905
(58) Field of Classification Search ................. 464/111, 464/115, 116, 132, 905
See application file for complete search history.

(56) References Cited

U.S. PATENT DOCUMENTS 5,380,249 A 1/1995 Krude

| | | | |
|---|---|---|---|
| 5,391,013 A | 2/1995 | Ricks et al. | |
| 6,431,986 B2 * | 8/2002 | Olszewski | 464/111 |
| 2001/0005694 A1 | 6/2001 | Olszewski | |
| 2006/0079336 A1 | 4/2006 | Ando et al. | |

FOREIGN PATENT DOCUMENTS

JP 11-125262 5/1999

OTHER PUBLICATIONS

U.S. Appl. No. 11/234,199, filed Sep. 26, 2005, Ando et al.
U.S. Appl. No. 11/270,628, filed Nov. 10, 2005, Kashiwagi et al.
U.S. Appl. No. 11/617,237, filed Dec. 28, 2006, Ando et al.

* cited by examiner

*Primary Examiner*—Aaron M Dunwoody
(74) *Attorney, Agent, or Firm*—Oblon, Spivak, McClelland, Maier & Neustadt, P.C.

(57) ABSTRACT

In a tripod-type constant velocity joint having an inner joint member, an outer joint member, and three roller units, the radius R1, outer width W1, and inner width W2 of the outer periphery cylindrical surface of each roller unit, and the radius R3 of the center hole of each roller unit satisfy the inequalities: $0.5Rtc(1/\cos 0.3\Theta - 1) + (R1-R3)\mu < W1$ and $1.5Rtc(1-\cos 0.3\Theta) + (R1-R3)\mu < W2$, where Rtc: the radius of a circle passing through the respective centers of tripod spherical surfaces of the inner joint member, $\Theta$: the maximum joint angle between the outer joint member and the inner joint member, and $\mu$: coefficient of friction between each tripod spherical surface and the wall surface of the center hole of the corresponding roller unit.

6 Claims, 5 Drawing Sheets

TRIPOD-TYPE CONSTANT VELOCITY JOINT

INCORPORATION BY REFERENCE

This application based on and claims priority under 35 U.S.C. §119 with respect to Japanese Patent Application No. 2004-299425 filed on Oct. 13, 2004. The contents of that application are incorporated herein by reference.

BACKGROUND OF THE INVENTION

1. Field of the Invention

The present invention relates to a tripod-type constant velocity joint used in a force transmission system of a vehicle; for example, between each side gear of a differential gear unit and a drive axle for driving a wheel.

2. Description of the Related Art

As shown in, for example, Japanese Utility Model Application Laid-Open (kokai) No. H4-84923, a tripod-type constant velocity joint comprises a tripod case (outer joint member), a trunnion (inner joint member), and three joint rollers (roller units). The tripod case has three roller grooves (guide grooves) formed on the inner surface thereof and extending along the axial direction. The trunnion has three trunnion shafts (tripod shafts) each extending radially outward and having a peripheral surface in the form of a partial sphere (tripod spherical surface) at the distal end thereof. Each of the joint rollers has an inner circumferential surface (center hole) which is slidably fitted onto the corresponding partial spherical peripheral surface of the trunnion, and an outer circumferential surface that is engaged with the corresponding roller groove of the tripod case such that the joint roller can roll only along the axial direction. In the tripod-type constant velocity joint disclosed in the publication, each joint roller is composed of an outer race (outer roller), and an inner race (inner ring) that is rotatably engaged with the inner circumferential surface of the outer race via needle rollers (rolling elements). The needle rollers reduce frictional resistance between the trunnion shafts and the joint rollers, which roll within the corresponding roller grooves when the joint is rotated with a joint angle formed between the tripod case and the trunnion, and reduce thrust forces which press the tripod case and the trunnion toward axially opposite directions, to thereby prevent occurrence of problems of generation of vibration and noise and loss of power.

In such a tripod-type constant velocity joint, the inner joint member carrying the roller units has its largest radius at the outer-side corner portion of the outer circumference of each roller unit, and the inner surface of the outer joint member has its maximum radius at portions each facing the corresponding corner portion. Therefore, the maximum outer radius of the outer joint member; i.e., the maximum outer radius of the constant velocity joint, is equal to the sum of the maximum radius of the inner surface of the outer joint member and a wall thickness required in consideration of mechanical strength. In order to reduce the size of the joint through reduction of the maximum outer radius thereof, the corner portions of the outer circumference of each roller unit may be chamfered or tapered such that the width of the outer circumferential surface of each roller unit becomes smaller than the width of the roller unit (see FIG. 2). However, the above-described configuration for reducing the size of the joint causes the following problem, particularly in the case where each roller unit is composed of an outer roller and an inner ring and has a large diameter, although such a problem arises even in the case where each roller unit is a single member of a simple configuration.

Each guide groove of the outer joint member has a pair of elongated, parallel flat surfaces facing each other, and the outer circumferential surface of each roller unit is located between and in engagement with the elongated flat surfaces, so that the roller unit can roll only along the longitudinal direction of the guide groove, whereby movement of each roller unit in other directions with respect to the corresponding guide groove is restricted. Via such roller units, force is transmitted between the outer joint member and the inner joint member of the constant velocity joint. Specifically, depending on the direction of transmission of force, one of the elongated flat surfaces comes into contact with the outer circumferential surface of the corresponding roller unit, whereby force is transmitted from the outer joint member to the corresponding tripod spherical surface of the inner joint member via the roller unit, and a slight clearance is produced between the other elongated flat surface and the outer circumferential surface of the roller unit.

As described above, each roller unit is allowed to roll only along the longitudinal direction of the corresponding guide groove, and is restricted from moving in other directions with respect to the corresponding guide groove. Therefore, each roller does not move with respect to the outer joint member in a direction perpendicular to the center axis thereof. In contrast, when the constant velocity joint is rotated with a joint angle formed, each tripod spherical surface of the inner joint member moves with respect to the outer joint member in a direction perpendicular to the center axis thereof. Therefore, each tripod spherical surface fitted in the cylindrical center hole of the corresponding roller unit slides within the center hole. Because of this sliding movement, a frictional force is generated along the wall surface of the center hole at the position of contact between the tripod spherical surface and the wall surface of the center hole, wherein force is transmitted through the contact point. Thus, the line of action of the force transmitted from the wall surface of the center hole to the tripod spherical surface via the contact point inclines from a direction perpendicular to the center axis of the corresponding tripod shaft extending radially.

In the case where the width of the outer circumferential surface of each roller unit is made smaller than the width of the roller unit as described above, the inclined line of action of the force deviates from the outer circumferential surface of the roller unit in contact with one of the elongated flat surfaces of the guide groove, and at the opposite side, the outer circumferential surface of the roller unit separates from the other elongated flat surface, with the possible result that the roller unit inclines. When such an inclination is produced, on the side opposite the side on which force is transmitted, the roller unit comes into contact with the inner surface of the guide groove, and because of the friction resistance produced therebetween, there is produced a thrust force which presses the outer and inner joint members toward axially opposite directions. Since this thrust force abruptly changes with rotational angle of the constant velocity joint, the problem of generation of vibration and noise and loss of power arises.

SUMMARY OF THE INVENTION

In view of the foregoing, an object of the present invention is to provide a tripod-type constant velocity joint which can prevent generation of vibration and noise and loss of power.

To achieve the above-described object, the present invention provides a tripod-type constant velocity joint, comprising an outer joint member coaxially connected to a first rotation shaft and formed of a cylindrical tubular body having three guide grooves formed on an inner surface thereof at substantially equal circumferential intervals, the guide grooves extending parallel to a center axis of the tubular body; an inner joint member coaxially connected to a second rotation shaft and having a boss portion, and three tripod shafts provided on the boss portion at substantially equal circumferential intervals and extending radially outward, each of the tripod shafts having a tripod spherical surface formed at a distal end portion thereof; and three roller units each having a cylindrical center hole and a cylindrical surface formed on an outer periphery thereof and being coaxial with the center hole. The outer joint member, the inner joint member, and the three roller units are assembled together such that the roller units are rotatably supported on the corresponding tripod shafts of the inner joint member and received in the corresponding guide grooves of the outer joint member. Each of the guide grooves includes a pair of parallel elongated flat surfaces facing each other while sandwiching a first center plane including the center axis of the tubular body. Each roller unit is supported on the corresponding tripod shaft such that a wall surface of the center hole is slidably fitted on the corresponding tripod spherical surface, and the cylindrical surface is located between and in engagement with the pair of elongated flat surfaces of the corresponding guide groove such that only rolling along the center axis of the tubular body is permitted. The outer periphery cylindrical surface of each roller unit has a width smaller than that of each roller unit. The radius, outer width, and inner width of the outer periphery cylindrical surface of each roller unit, and the radius of the center hole of each roller unit are determined to satisfy the following two inequalities:

$$0.5 Rtc(1/\cos 0.3\Theta - 1) + (R1-R3)\mu < W1$$

$$1.5 Rtc(1-\cos 0.3\Theta) + (R1-R3)\mu < W2$$

where

Rtc: the radius of a circle passing through the respective centers of the tripod spherical surfaces, $\Theta$: the maximum joint angle formed between the outer joint member and the inner joint member, R1: the radius of the outer periphery cylindrical surface of each roller unit, R3: the radius of the center hole of each roller unit, $\mu$: coefficient of friction between each tripod spherical surface and the wall surface of the center hole of the corresponding roller unit, W1: the outer width of the outer periphery cylindrical surface of each roller unit (the distance between a second center plane, which extends perpendicular to the first center plane and parallel to the center axis of the tubular body at a radial position separated from the center axis by the radius of the circle passing through the respective centers of the tripod spherical surfaces, and a side edge of the outer periphery cylindrical surface of the roller unit received in the corresponding guide groove, the side edge being located opposite the center axis), and W2: the inner width of the outer periphery cylindrical surface of each roller unit (the distance between the second center plane and a side edge of the outer periphery cylindrical surface of the roller unit, the side edge being located on the side toward the center axis).

According to the present invention, the radius, outer width, and inner width of the outer periphery cylindrical surface of each roller unit, and the radius of the center hole of each roller unit are determined to satisfy the following two inequalities.

$$0.5 Rtc(1/\cos 0.3\Theta - 1) + (R1-R3)\mu < W1$$

$$1.5 Rtc(1-\cos 0.3\Theta) + (R1-R3)\mu < W2$$

Therefore, even when the constant velocity joint rotates while forming a joint angle which is 30% the maximum joint angle, the line of action of the force transmitted from the elongated flat surfaces of each guide groove to the corresponding tripod spherical surface via the corresponding roller unit does not pass through a point outside the outer periphery cylindrical surface of the roller unit at the outer edge or the inner edge of the cylindrical surface in contact with the elongated flat surfaces of the guide groove. Therefore, at least in a region in which the joint angle is less than 30% the maximum joint angle, a portion of the cylindrical surface on the side opposite the side where force is transmitted is prevented from separating from the corresponding elongated flat surface, which would otherwise result in inclination of the roller unit. Thus, the roller unit is prevented from coming into contact with the wall surface of the guide groove on the side opposite the side where force is transmitted. Accordingly, it is possible to prevent generation of vibration and noise and loss of power, which would otherwise occur as a result of generation of thrust force which presses the outer joint member and the inner joint member toward axially opposite directions. That is, in the range of ordinary use of the constant velocity joint in which the joint angle is 30% the maximum joint angle or less, vibration, noise, and power loss attributable to thrust force can be prevented, and practical performance can be secured within the range of ordinary use.

Preferably, the radius, outer width, and inner width of the outer periphery cylindrical surface of each roller unit, and the radius of the center hole of each roller unit are determined to satisfy the following two inequalities:

$$W1 < 0.5 Rtc(1/\cos \Theta - 1) + (R1-R3)\mu$$

$$W2 < 1.5 Rtc(1-\cos \Theta) + (R1-R3)\mu.$$

In this case, each roller unit is prevented from having an excessively large width. The respective right sides of these two inequalities define the ranges of W1 and W2 in which each roller unit does not incline even when the joint angle is the maximum joint angle $\Theta$. Therefore, further increasing the values of W1 and W2 results only in an increase in the maximum radius of the tubular body accommodating the roller units, and is not effective. Accordingly, when the outer width, inner width, etc. of the outer periphery cylindrical surface of each roller unit are determined in accordance with the above-described inequalities, the constant velocity joint can be prevented from becoming excessively large.

In the case where the maximum joint angle is small, the radius, outer width, and inner width of the outer periphery cylindrical surface of each roller unit, and the radius of the center hole of each roller unit may be determined to satisfy an inequality 0.5Rtc(1−cos 0.3$\Theta$)+(R1−R3)$\mu$<W1 instead of the inequality 0.5Rtc(1/cos 0.3$\Theta$−1)+(R1−R3)$\mu$<W1.

In this case, the radius, outer width, and inner width of the outer periphery cylindrical surface of each roller unit, and the radius of the center hole of each roller unit may be determined to satisfy an inequality W1<0.5 Rtc(1−cos $\Theta$)+(R1−R3)$\mu$ instead of the above-described inequality W1<0.5 Rtc(1/cos $\Theta$−1)+(R1−R3)$\mu$.

Preferably, each roller unit has a pair of taper surfaces which are formed at opposite side portions of the outer periphery cylindrical surface thereof so as to make the width of the cylindrical surface smaller than the width of the roller unit, and each guide groove has a pair of slant surfaces extending from opposite side edges of each of the elongated flat surfaces thereof, the slant surfaces coming into contact with portions of the taper surfaces of the corresponding roller unit, the portions being adjacent to the cylindrical surface, so as to restrict axial movement of the corresponding roller unit. By virtue of this structure, the maximum radius of the outer joint member can be reduced relatively easily, whereby the size of the constant velocity joint can be reduced.

Preferably, each roller unit is composed of an outer roller which has the cylindrical surface formed on the outer periphery thereof, and an inner ring which has the center hole and which is in engagement with an inner circumferential surface of the outer roller via rolling elements such that relative rotation of the inner ring is permitted but axial relative movement of the inner ring is restricted. This structure reduces the thrust force that is produced because of friction resistance generated between the outer joint member and the inner joint member when the constant velocity joint rotates with a non-zero joint angle and which presses the outer joint member and the inner joint member toward axially opposite directions, whereby generation of vibration and noise and loss of power in the constant velocity joint can be further reduced.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

Next, a tripod-type constant velocity joint according to an embodiment of the present invention will be described with reference to FIGS. 1 to 5. First, the structure of the constant velocity joint according to the present embodiment will be described with reference to FIGS. 1 and 2. This constant velocity joint comprises an outer joint member 10, an inner joint member 20, and three roller units 25.

Figure 1:
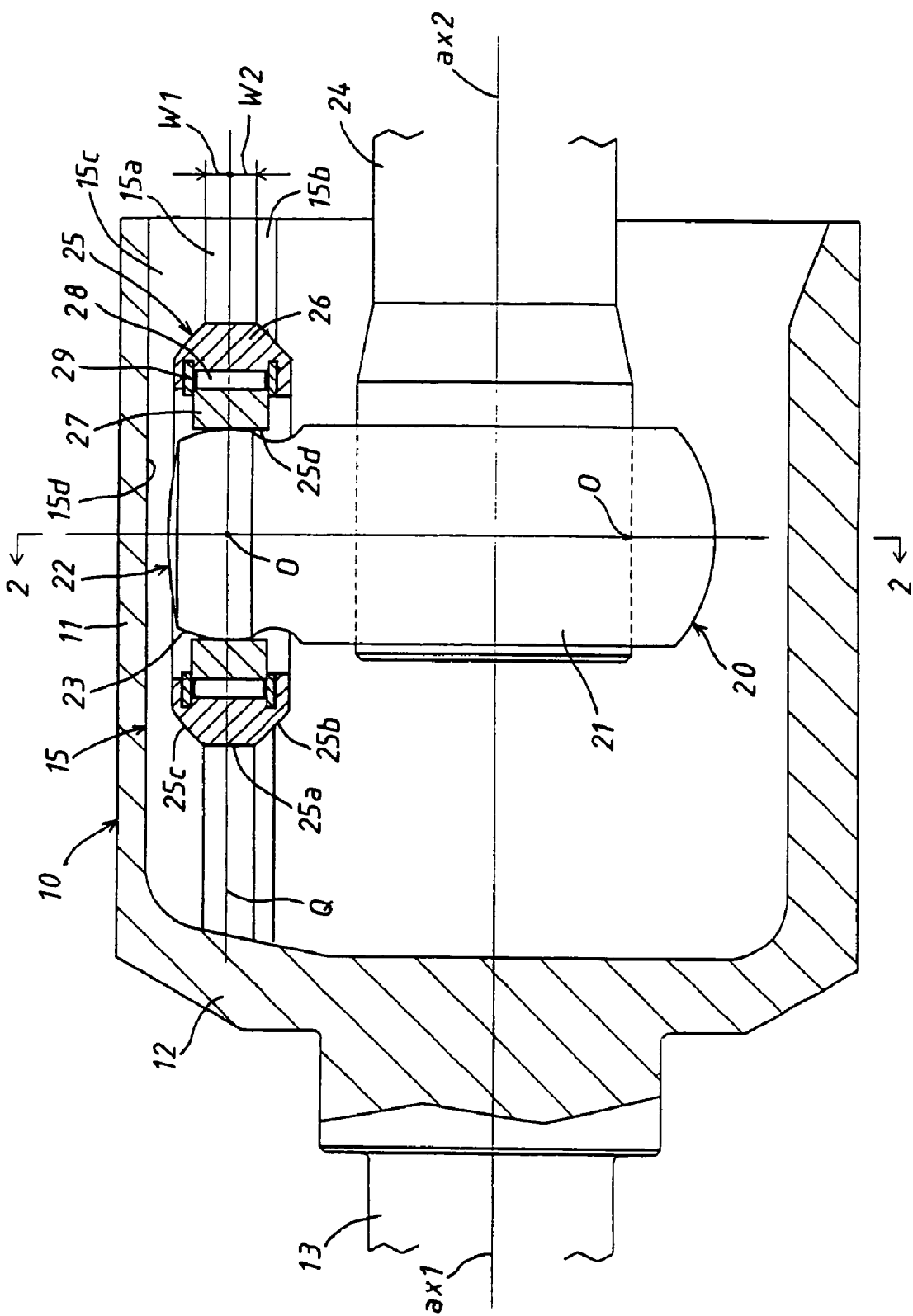
FIG. 1 is a longitudinal cross sectional view showing the overall structure of a tripod-type constant velocity joint according to an embodiment of the present invention.
Figure 2:
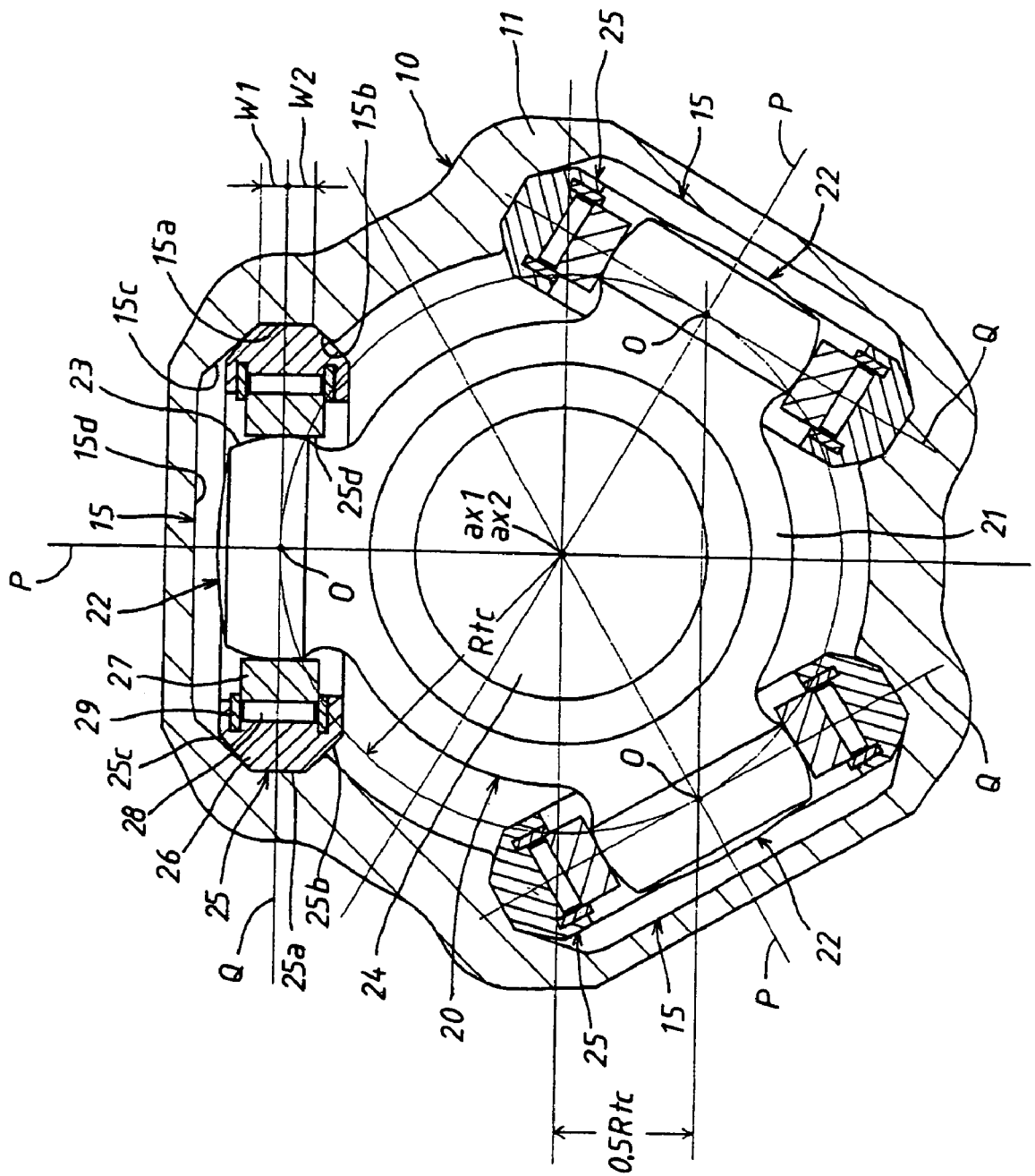
FIG. 2 is a cross sectional view of the joint taken along line 2-2 of FIG. 1.

As shown in FIGS. 1 and 2, the outer joint member 10 includes a cylindrical tubular body 11 having a center axis ax1, and a bottom portion 12 closing the tubular body 11 at one axial end thereof. A first rotation shaft 13 is provided on the outer surface of the bottom portion 12 to be coaxial with the tubular body 11. These portions and shaft 11 to 13 are integrally formed through forging or any other suitable process. Three guide grooves 15 are formed on the inner surface of the tubular body 11 at circumferential intervals of 120 degrees such that the guide grooves 15 extend parallel to the center axis ax1 over the entire length of the tubular body 11. Ends of the guide grooves 15 opposite the bottom portion 12 are opened to the outside. As shown mainly in FIG. 2, the guide grooves 15 are of identical cross sectional shape. Each guide groove 15 has a pair of parallel elongated flat surfaces 15a extending along the longitudinal direction of the guide groove 15 and facing each other while sandwiching a first center plane P including the center axis ax1 of the outer joint member 10; inner slant surfaces 15b and outer slant surfaces 15c extending from the opposite lateral edges of the respective elongated flat surfaces 15a and approaching toward the first center plane P; and a bottom surface 15d extending perpendicular to the first center plane P and connecting the end edges of the outer slant surfaces 15c. Each guide groove 15 is opened to the inner surface of the outer joint member 10 at the end edges of the inner slant surfaces 15b. The slant angles of the inner slant surfaces 15b and the outer slant surfaces 15c with respect to the first center plane P are 42 degrees, respectively.

A second center plane Q, which extends perpendicular to the first center plane P, passes through the widthwise center portions of the elongated flat surfaces 15a. The distance between the second center plane Q and the side edges of the elongated flat surfaces 15a opposite the center axis ax1 and the distance between the second center plane Q and the side edges of the elongated flat surfaces 15a on the side toward the center axis ax1 are substantially equal to the outer width W1 and the inner width W2 of an outer periphery cylindrical surface 25a of the roller unit 25 to be described later. The radius of the outer surface of the tubular body 11, which is the sum of the radius of the inner surface of the tubular body 11, the depth of the three guide grooves 15 formed thereon, and a wall thickness required in consideration of mechanical strength, attains a maximum in the vicinity of locations corresponding to the outer slant surfaces 15c.

The inner joint member 20 includes a boss portion 21 having a center axis ax2, and three tripod shafts 22 provided on the boss portion 21 at circumferential intervals of 120 degrees and extending radially outward. Each tripod shaft 22 has a tripod spherical surface 23 formed at a distal end portion thereof and assuming the shape of a small-height barrel. A second rotation shaft 24 is fitted into the boss portion 21 to be coaxial therewith via splines or any other suitable engagement means. The radial distance Rtc between the center axis ax2 and the center O of each tripod spherical surface 23 is equal to the distance between the center axis ax1 of the outer joint member 10 and the second center plane Q of each guide groove 15.

The roller units 25 used in the present embodiment are of a double roller type, and are each composed of an outer roller 26 and an inner ring 27, which is engaged with the inner circumferential surface of the outer roller 26 via needle rollers (rolling elements) 28 such that the inner ring 27 is coaxial with the outer roller 26 and is rotatable with respect thereto. The axial movements of the inner ring 27 and the rolling elements 28 with respect to the outer roller 26 are restricted by stopper rings 29 fixed to the opposite ends of the inner circumferential surface of the outer roller 26. The roller units 25 are attached to the tripod shafts 22 in such a manner that the tripod spherical surfaces 23 of the tripod shafts 22 are fitted into cylindrical center holes 25d of the inner rings 27. Thus, the roller units 25 are supported at the distal end portions of the tripod shafts 22 in such a manner that the roller units 25 are axially slidable and are swingable about the respective centers O of the tripod spherical surfaces.

A cylindrical surface 25a on the outer periphery of the outer roller 26 has a pair of taper surfaces 25b and 25c formed at the opposite side portions thereof, whereby the width of the cylindrical surface 25a is made smaller than the width of the outer roller 26, which is the widest portion of the roller unit 25. The diameter of the cylindrical surface 25a of the outer roller 26 is slightly smaller than the distance between the elongated flat surfaces 15a of each guide groove 15 of the tubular body 11. Therefore, the outer roller 26 can be fitted in the guide groove 15 such that it can roll within the guide groove 15 with no substantial clearance being formed. In the present embodiment, each of the taper surfaces 25b and 25c is an outwardly curved, large arcuate surface; and the width (=W1+W2) of the cylindrical surface 25a and the slant angles of the taper surfaces 25b and 25c are set in such a manner that in a state in which the roller unit 25 is fitted into the guide groove 15, tip portions of the taper surfaces 25b and 25c come into contact with the proximal portions (portions close to the elongated flat surfaces 15a) of the slant surfaces 15b and 15c of the guide groove 15. Thus, in a state in which the inner joint member 20, which carries the roller units 25 on the tripod spherical surfaces 23, is inserted into the outer joint member 10, the cylindrical surface 25a of each outer roller 26 is located between and engaged with the pair of elongated flat surfaces 15a of the corresponding guide groove 15 such that it can roll along the direction of the center axis ax1, and the tip portions of the taper surfaces 25b and 25c come into contact with the proximal portions of the slant surfaces 15b and 15c of the guide groove 15, whereby the roller unit 25 is restricted from moving in directions other than the direction along the center axis ax1. The outer width W1 of the cylindrical surface 25a of the roller unit 25, which is received in the guide groove 15, is the distance between the second center plane Q and the side edge of the cylindrical surface 25a opposite the center axis ax1; and the inner width W2 of the cylindrical surface 25a is the distance between the second center plane Q and the side edge of the cylindrical surface 25a on the side toward the center axis ax1.

Next, with reference to FIGS. 3 to 5, there will be described the case where the constant velocity joint is rotated with a joint angle θ formed between the center axis ax1 of the outer joint member 10 and the center axis ax2 of the inner joint member 20. In the case where the joint angle θ is zero as shown in FIGS. 1 and 2, the center O of the tripod spherical surface at the distal end of each tripod shaft 22 of the inner joint member 20 is always located on the second center plane Q of the corresponding roller unit 25. However, in the case where the constant velocity joint is rotated in the state in which the joint angle θ is not zero, as the constant velocity joint rotates, the center O of each tripod spherical surface comes into coincidence with and deviates from the second center plane Q. Thus, when the center O of a certain tripod spherical surface is located on a plane including the center axes ax1 and ax2 as shown in FIGS. 3 and 4, the center O of the tripod spherical surface is most widely separated from the second center plane Q toward the center axis ax1; and when the center O of the certain tripod spherical surface is located on a plane including the center axis ax2 and being perpendicular to the plane including the center axes ax1 and ax2 as shown in FIG. 5, the center O of the tripod spherical surface is most widely separated from the second center plane Q toward the direction away from the center axis ax1.

First, the case where the constant velocity joint forms a joint angle θ in this state and where the center O of a certain tripod spherical surface is located on the plane including the center axes ax1 and ax2 will be described with reference to FIGS. 3 and 4. As shown in FIG. 3, the inner joint member 20 turns with respect to the outer joint member 10 about a line connecting the centers O of the two remaining tripod spherical surfaces. As described above, the distance between the center axis ax1 and the second center plane Q is equal to the radius Rtc of a circle passing through the centers of the tripod spherical surfaces, and thus, the distance between the turning center of the inner joint member 20 and the center line ax1 is 0.5Rtc. Therefore, the movement amount $D2(θ)$ of the center O of the certain tripod spherical surface that moves from the second center plane Q toward the center axis ax1 can be represented as follows:

$$D2(θ)=1.5Rtc(1-\cos θ).$$

Figure 3:
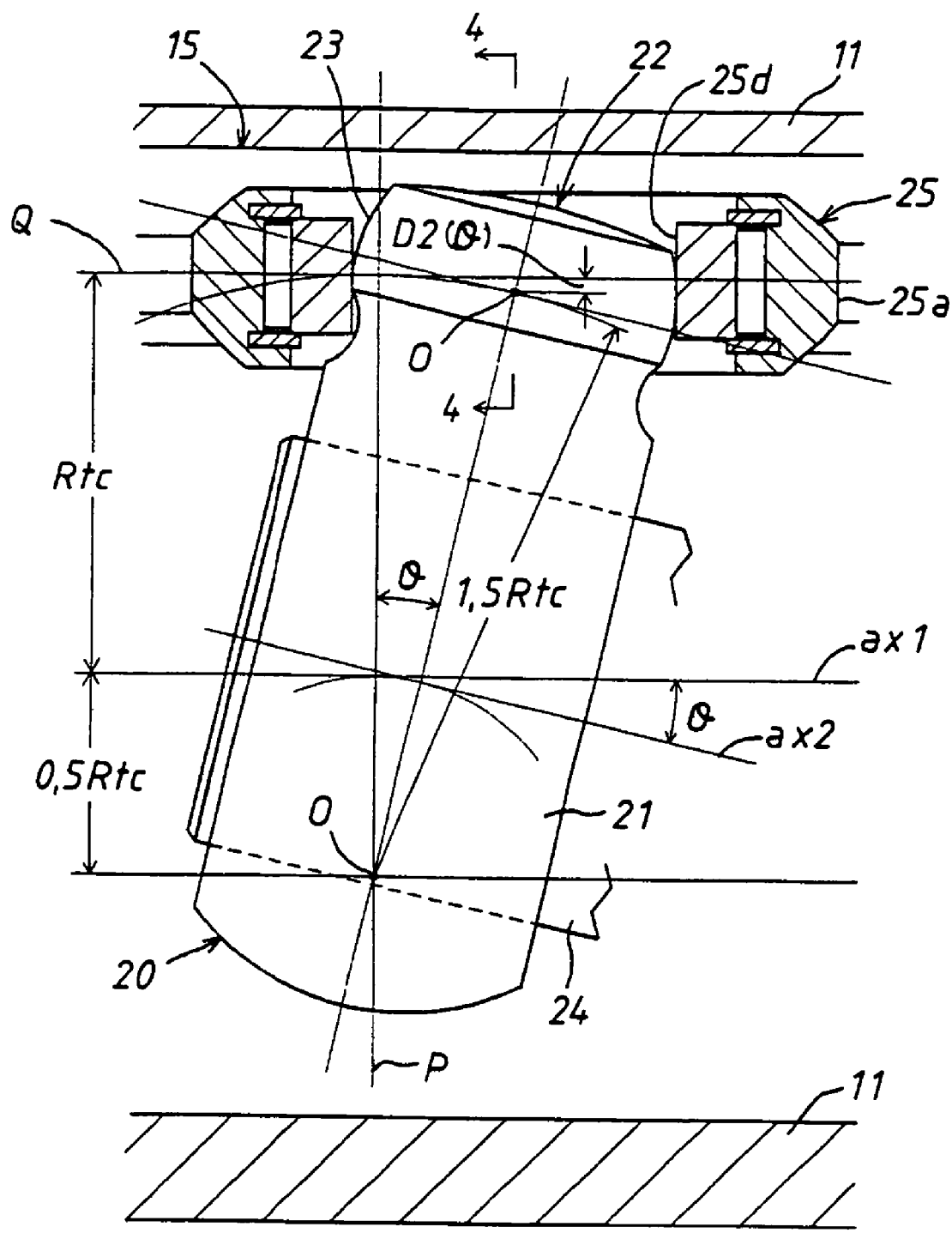
FIG. 3 is a view showing an operation state of the joint.
Figure 4:
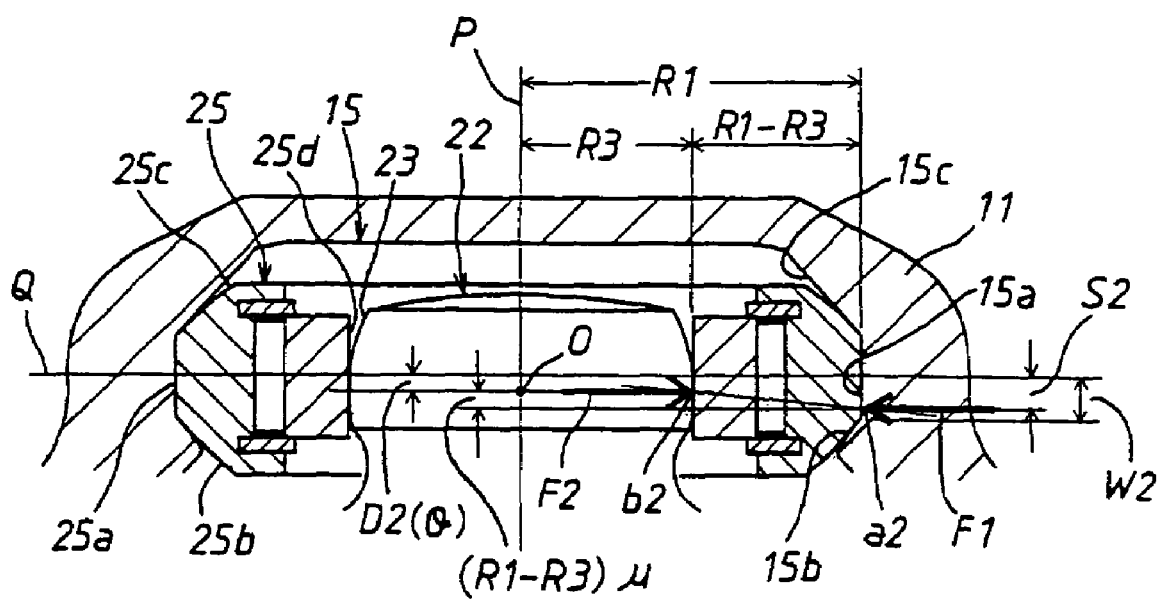
FIG. 4 is a cross sectional view taken along line 4-4 of FIG. 3.
Figure 5:
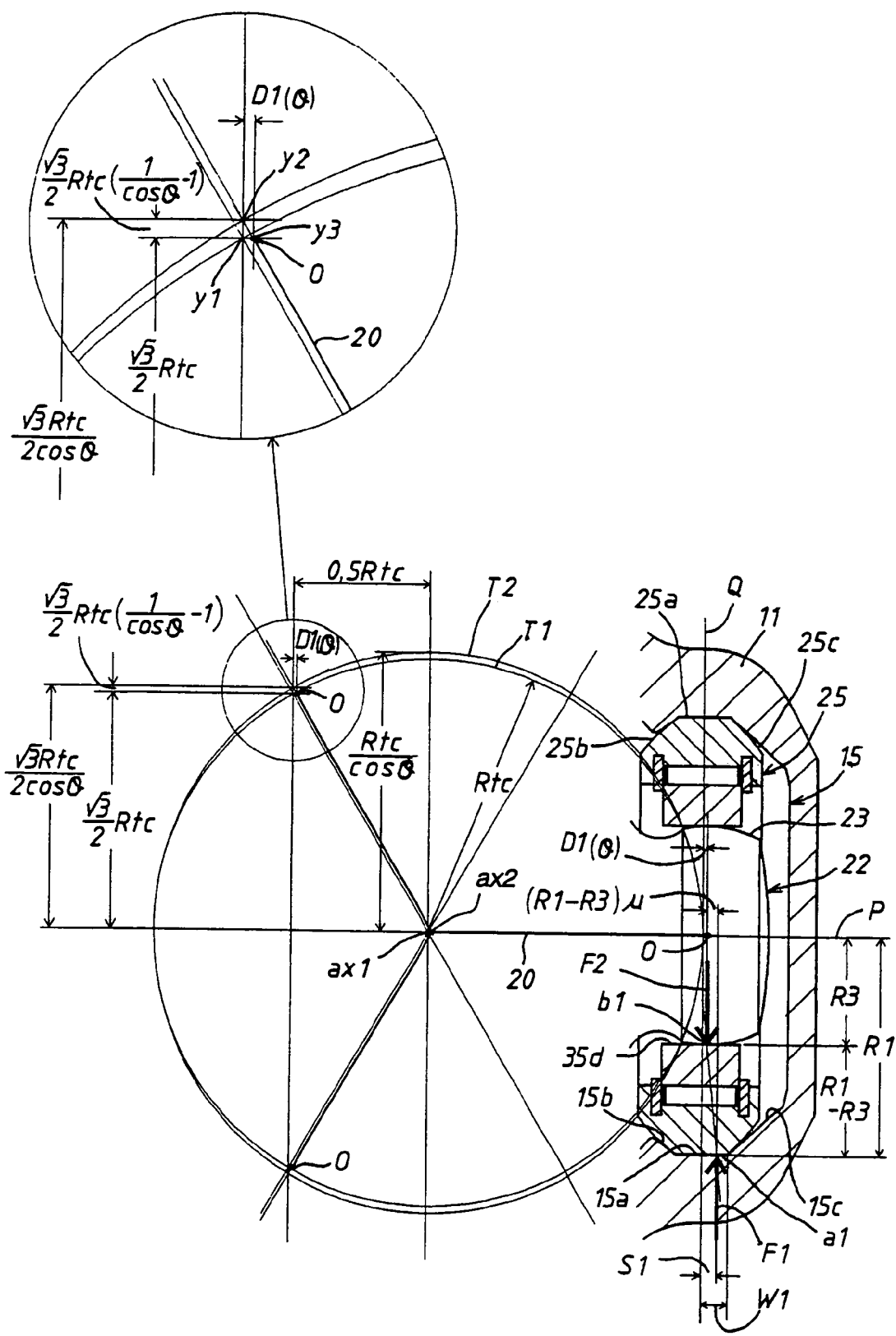
FIG. 5 is a view showing an operation state of the joint differing from the operation state of FIG. 3.

FIG. 4 is a cross sectional view taken along line 4-4 of FIG. 3 and showing the state in which force is transmitted from the outer joint member 10 to the inner joint member 20 via a certain roller unit 25. Force F1 acting at position a2 represents the resultant of forces transmitted from the outer joint member 10 to the roller unit 25 while being distributed over the entire width of the elongated flat surface 15a of the guide groove 15 and the cylindrical surface 25a of the roller unit 25. Force F2 acting at position b2 represents the reaction of a force transmitted from the roller unit 25 to the corresponding tripod spherical surface 23 at the position of contact between the tripod spherical surface 23 and the wall surface of the center hole 25d of the roller unit 25. In this state, since the center O of the tripod spherical surface has moved toward the center axis ax1 by distance $D2(θ)$, the contact position b2 at which the reaction force F2 acts has moved by distance $D2(θ)$ from the second center plane Q toward the center axis ax1. The direction of the line of action of the force transmitted from the elongated flat surface 15a of the guide groove 15 to the tripod spherical surface 23 of the tripod shaft 22 via the roller unit 25 is perpendicular to the center axis of the tripod shaft 22. However, since the tripod spherical surface 23 has been moving with respect to the center hole 25d toward the center line ax1 immediately before reaching this sate, there is produced is a state in which, because of frictional force acting between the tripod spherical surface 23 and the wall surface of the center hole 25d, the direction of the line of action of the force transmitted via the roller unit 25 from the acting position a2 of the resultant force F1 to the contact position b2 at which the reaction force F2 acts inclines by a friction angle corresponding to the coefficient μ of friction between the tripod spherical surface 23 and the wall surface of the center hole 25d, in a direction such that the acting position a2 is located further from the second center plane Q than is the contact position b2.

In this state, the distance S2 between the second center plane Q and the acting position a2 at which the resultant force F1 acts can be represented as follows:

$$S2 = D2(θ) + (R1 - R3)μ$$
$$= 1.5Rtc(1 - \cos θ) + (R1 - R3)μ.$$

where R1 is the radius of the outer periphery cylindrical surface 25a of the roller unit 25, and R3 is the radius of the cylindrical center hole 25d of the roller unit 25. When Rtc, R1, R3, and μ are constant, the value of S2 increases with the joint angle θ, and becomes maximum when the joint angle θ reaches the maximum joint angle Θ (for example, 23 degrees). Herein, the maximum joint angle Θ refers to the maximum value of the joint angle θ at which the constant velocity joint can rotate without causing interference of relevant portions. The joint angle θ in the ordinary state of use is about 30% the maximum joint angle Θ. In the present embodiment, the radius R1 and the inner width W2 of the outer periphery cylindrical surface 25a of the roller unit 25 and the radius R3 of the cylindrical center hole 25d are set such that the inner width W2 of the cylindrical surface 25a of the roller unit 25 becomes greater than the distance S2 in the ordinary state of use and smaller than the distance S2 in a state in which the joint angle θ is the maximum joint angle Θ; that is, the following relation is satisfied.

$$1.5 Rtc(1 - \cos 0.3\Theta) + (R1 - R3)\mu < W2 < 1.5 Rtc(1 - \cos\Theta) + (R1 - R3)\mu$$

Next, with reference to FIG. 5, there will be described the case where the constant velocity joint forms a joint angle θ and where the center O of the certain tripod spherical surface is located on a plane including the center axis ax2 and being perpendicular to the plane including the center axes ax1 and ax2. In this state, the inner joint member 20 (illustrated skeletally) turns with respect to the outer joint member 10 about a line which is perpendicular to the plane including the center axes ax1 and ax2 and which intersects the center axis ax1. Here, there is considered a closed line which is formed at an intersection between an imaginary cylindrical surface centered at the center axis ax1 and being inscribed with respect to the respective second center planes Q of the guide grooves 15, and the plane containing the center O of the tripod spherical surfaces 23. When the joint angle θ formed between the outer joint member 10 and the inner joint member 20 is zero, the closed line becomes a circle indicated by T1 in FIG. 5, wherein the circle has a radius Rtc. When the joint angle θ is not zero, the closed line becomes an ellipse indicated by T2 in FIG. 5, wherein the circle has a minor radius of Rtc and a major radius of Rtc/cos θ.

Before the joint angle θ increases from zero, as shown in FIG. 2 as well, the center O of each tripod spherical surface 23 is located on the circle T1 (for example, see position y1 in a partial enlarged view of FIG. 5). In this state, the distance between the centers O of the tripod spherical surfaces not located on the plane perpendicular to the plane including the center axes ax1 and ax2, and the distance between the points at which the respective center lines (the lines of intersection between the first and second center planes P and Q) of the corresponding two guide grooves 15 intersect with a lateral center plane (a plane including the respective centers O of the tripod spherical surfaces) of the inner joint member 20 are both $3^{1/2}$Rtc. When the joint angle θ increases from zero, although the distance between the centers O of the two tripod spherical surfaces is maintained at $3^{1/2}$Rtc, the positions at which the center lines of the two guide grooves 15 intersect with the lateral center plane of the inner joint member 20 move from y1 to y2, because the inner joint member 20 inclines with respect to the outer joint member 10 by the joint angle θ. Further, the distance therebetween increases to $3^{1/2}$Rtc/cos θ. Therefore, the amount of outward movement of the two roller units 25 fitted onto the tripod spherical surfaces 23 is represented as follows:

$$(3^{1/2} Rtc/\cos\theta - 3^{1/2} Rtc)/2 = 3^{1/2} Rtc(1/\cos\theta - 1)/2.$$

With the movement of the roller units 25, the centers O of the two tripod spherical surfaces move from y1 and y3, and the movement amount D1(θ) of the centers O can be represented as follows:

$$D1(\theta) = 0.5 Rtc(1/\cos\theta - 1).$$

As a result, the center O of the tripod spherical surface located in the plane perpendicular to the plane including the center axes ax1 and ax2 also moves by D1(θ) from the above-described position on the circle T1; i.e., the position on the second center plane Q toward the direction away from the center axis ax1.

The right-hand partial cross sectional view of FIG. 5 shows the state in which force is transmitted from the outer joint member 10 to the inner joint member 20 via the roller unit 25. Force F1 acting at position a1 represents the resultant of forces transmitted from the outer joint member 10 to the roller unit 25 as in the case of FIG. 4. Force F2 acting at position b1 represents the reaction to a force transmitted from the roller unit 25 to the corresponding tripod spherical surface 23 as in the case of FIG. 4. In this state, since the center O of the tripod spherical surface has moved by D1(θ) toward the direction away from the center axis ax1, the contact position b1 at which the reaction force F2 acts and at which the tripod spherical surface 23 is in contact with the wall surface of the center hole 25d also has moved by D1(θ) from the second center plane Q toward the direction away from the center axis ax1. Since the tripod spherical surface 23 has been moving with respect to the center hole 25d toward the direction away from the center line ax1 immediately before reaching this state, there is produced a state in which, because of frictional force acting between the tripod spherical surface 23 and the wall surface of the center hole 25d, the direction of the line of action of the force transmitted, via the roller unit 25, from the acting position a1 of the resultant force F1 to the contact position b1 at which the reaction force F2 acts inclines by a friction angle corresponding to the coefficient μ of friction between the tripod spherical surface 23 and the wall surface of the center hole 25d in a direction such that the acting position a1 is located further from the second center plane Q than is the contact position b1.

In this state, the distance S1 between the second center plane Q and the acting position a1 at which the resultant force F1 acts can be represented as follows:

$$S1 = D1(\theta) + (R1 - R3)\mu$$
$$= 0.5 Rtc(1/\cos\theta - 1) + (R1 - R3)\mu.$$

When Rtc, R1, R3, and μ are constant, the value of S1 increases with the joint angle θ, and becomes maximum when the joint angle θ reaches the maximum joint angle Θ. Herein, the meaning and ordinary value of the maximum joint angle Θ are the same as those described above. In this case as well, the joint angle θ in the ordinary state of use is about 30% the maximum joint angle Θ. In the present embodiment, the radius R1 and the outer width W1 of the outer periphery cylindrical surface 25a of the roller unit 25 and the radius R3 of the cylindrical center hole 25d are set such that the outer with W1 of the cylindrical surface 25a of the roller unit 25 becomes greater than the distance S1 in the ordinary state of use and smaller than the distance S1 in a state in which the joint angle θ has reached the maximum joint angle Θ; that is, the following relation is satisfied.

$$0.5 Rtc(1/\cos 0.3\Theta - 1) + (R1 - R3)\mu <$$
$$W1 < 0.5 Rtc(1/\cos\Theta - 1) + (R1 - R3)\mu$$

In the above-described embodiment, the pair of taper surfaces 25b and 25c are formed at the opposite side portions of the outer periphery cylindrical surface 25a of the outer roller 26, whereby the width of the cylindrical surface 25a is made smaller than the width of the roller unit 25; and the outer slant surface 15c is formed on the inner surface of the tubular body 11. Therefore, the outer diameter of the tubular body 11 can be reduced so as to reduce the size of the constant velocity joint. However, in the case where the width of the outer periphery cylindrical surface 25a of the roller unit 25 is reduced in the above-described manner, when the joint angle θ of the constant velocity joint approaches the maximum value Θ, as described above, the line of action of the force transmitted through the contact position b1, b2 between each tripod spherical surface 23 and the wall surface of the corresponding center hole 25d may pass through a point outside either of the opposite side edges of the cylindrical surface 25a of the roller unit 25 if the line of action inclines because of friction at the contact position b1, b2. In such a case, on the side opposite the side where force is transmitted, the cylindrical surface 25a separates from the elongated flat surface 15a, whereby the roller unit 25 inclines.

In the tripod-type constant velocity joint, on the side opposite the side where force is transmitted, a slight clearance is produced between the cylindrical surface 25a and the taper surfaces 25b and 25c, and the elongated flat surface 15a and the slant surfaces 15b and 15c, so that these elements do not come into friction engagement. However, when the roller unit 25 inclines as described above, on the side opposite the force transmission side, the taper surfaces 25b and 25c and the slant surfaces 15b and 15c come into contact with each other (in some cases, the cylindrical surface 25a and the elongated flat surface 15a come into contact with each other), and frictional resistance is produced, resulting in generation of a thrust force which presses the outer joint member 10 and the inner joint member 20 toward axially opposite directions. Since this thrust force abruptly changes with rotational angle of the constant velocity joint, the problem of generation of vibration and noise and loss of power arises.

However, in the above-described embodiment, the radius R1 and the outer width W1 of the cylindrical surface 25a of the roller unit 25, and the radius R3 of the cylindrical center hole 25d are set such that in a state in which the center O of a certain tripod spherical surface deviates furthest from the second center plane Q toward the direction opposite the center axis ax1 as shown in FIG. 5, the following relation is satisfied.

$$0.5Rtc(1/\cos 0.3\Theta-1)+(R1-R3)\mu < W1$$

Therefore, even when the constant velocity joint rotates while forming a joint angle in the ordinary state of use which is 30% the maximum joint angle Θ or while forming a joint angle larger than the ordinary state joint angle, the line of action of the force transmitted through the contact position b1, b2 between each tripod spherical surface 23 and the wall surface of the corresponding center hole 25d does not pass through a point outside the side edge of the cylindrical surface 25a of the roller unit 25 located opposite the center axis ax1. Further, the radius R1 and the outer width W1 of the cylindrical surface 25a of the roller unit 25, and the radius R3 of the cylindrical center hole 25d are set to satisfy the following relation.

$$W1 < 0.5Rtc(1/\cos \Theta-1)+(R1-R3)\mu$$

Therefore, the outer width W1 is prevented from becoming excessively large.

Moreover, the radius R1 and the inner width W2 of the cylindrical surface 25a of the roller unit 25, and the radius R3 of the cylindrical center hole 25d are set such that in a state in which the center O of a certain tripod spherical surface deviates furthest from the second center plane Q toward the center axis ax1 as shown in FIGS. 3 and 4, the following relation is satisfied.

$$1.5Rtc(1-\cos 0.3\Theta)+(R1-R3)\mu < W2$$

Therefore, as in the above-described case, even when the constant velocity joint rotates while forming a joint angle in the ordinary state of use or a greater joint angle, the line of action of the force transmitted through the contact position b1, b2 between each tripod spherical surface 23 and the wall surface of the corresponding center hole 25d does not pass through a point outside the side edge of the cylindrical surface 25a of the roller unit 25 located opposite the center axis ax1 side. Further, the radius R1 and the inner width W2 of the cylindrical surface 25a of the roller unit 25, and the radius R3 of the cylindrical center hole 25d are set to satisfy the following relation.

$$W2 < 1.5Rtc(1-\cos \Theta)+(R1-R3)\mu$$

Therefore, the outer width W2 is prevented from becoming excessively large.

As described above, in the state in which the constant velocity joint rotates while forming a joint angle in the ordinary state of use or a greater joint angle, even at a position where the center O of a certain tripod spherical surface deviates furthest from the second center plane Q toward the direction away from the center axis ax1 or a position where the center O of the certain tripod spherical surface deviates furthest from the second center plane Q toward the center axis ax1, one side portion of the cylindrical surface 25a does not separate from the corresponding elongated flat surface 15a, which would otherwise cause a problem such that the roller unit 25 inclines, and, on the side opposite the force transmission side, the taper surfaces 25b and 25c (and the cylindrical surface 25a) of the roller unit 25 and the slant surfaces 15b and 15c (and the elongated flat surface 15a) of the corresponding guide groove 15 does not come into contact with each other, thereby preventing generation of frictional resistance. Therefore, it is possible to prevent generation of thrust force which presses the outer joint member 10 and the inner joint member 20 toward axially opposite directions, to thereby prevent generation of vibration and noise and loss of power in the constant velocity joint.

Moreover, since the outer width W1 and the inner width W2 do not become excessively large, the widths of the taper surfaces 25b and 25c of each roller unit 25 can be increased, and the outer slant surfaces 15c of each guide groove 15 can be formed to extend along the outer taper surface 25c, whereby the distance between the center axis ax1 and the opposite shoulder portions of each guide groove 15 can be reduced. As a result, the maximum radius of the tubular body 11; i.e., the maximum radius of the constant velocity joint, which is the sum of the above distance and the wall thickness required from the viewpoint of strength, can be reduced.

In the above-described embodiment, the radius R1 and the outer width W1 of the cylindrical surface 25a of each roller unit 25, and the radius R3 of the cylindrical center hole 25d thereof are set such that in a state in which the center O of a certain tripod spherical surface deviates furthest from the second center plane Q toward the direction away from the center axis ax1 as shown in FIG. 5, the following relation is satisfied.

$$0.5Rtc(1/\cos 0.3\Theta - 1) + (R1-R3)\mu <$$
$$W1 < 0.5Rtc(1/\cos\Theta - 1) + (R1-R3)\mu$$

However, in the case where the maximum joint angle $\Theta$ is small, $1-\cos\theta \cong 1/\cos\theta - 1$. Therefore, the radius R1 and the outer width W1 of the cylindrical surface 25a of the roller unit 25, and the radius R3 of the cylindrical center hole 25d may be set such that in place of the above-described relation, the following relation is satisfied.

$$0.5Rtc(1-\cos 0.3\Theta) + (R1-R3)\mu < W1 < 0.5Rtc(1-\cos\Theta) + (R1-R3)\mu$$

Since such a constant velocity joint is usually used in a state in which the joint angle $\theta$ falls within a relatively narrow range (e.g., 7.5 degrees), even when the radius R1 of the cylindrical surface 25a, etc. are determined in this manner, effects substantially identical with the above-described effects can be attained. Further, since the expressions to be used at the position where the center O of a tripod spherical surface deviates furthest from the second center plane Q toward the direction away from the center axis ax1 and at the position where the center O of the tripod spherical surface deviates furthest from the second center plane Q toward the center axis ax1 can be replaced with corresponding approximated expressions, analysis is facilitated.

In the above-described embodiment, in order to make the width of the cylindrical surface 25a of each roller unit 25 smaller than that of the roller unit 25, the pair of curved taper surfaces 25b and 25c, which are close to flat surfaces but have a large radius of curvature, are formed at the opposite side portions of the cylindrical surface 25a of the outer roller 26 of the roller unit 25. This configuration enables the outer diameter of the tubular body 11 to be reduced through relatively simply machining, to thereby reduce the size of the constant velocity joint. However, the present embodiment is not limited to the above-described configuration, and curved taper surfaces each having a relatively small radius of curvature may be formed at the opposite side portions of the cylindrical surface 25a. Alternatively, the opposite side portions of the cylindrical surface 25a may be cut into a stepped shape, and a stepped portion for guiding the cylindrical surface 25a may be formed along each of the opposite side edges of the elongated flat surfaces 15a.

In the above-described embodiment, each roller unit 25 is a double-roller-type roller unit which is composed of the outer roller 26, which has the cylindrical surface 25a formed on the outer periphery thereof, and the inner ring 27, which has the center hole 25d and which is supported by the outer roller 26 via the needle rollers 28 such that its relative rotation is permitted but its axial relative movement is restricted. However, the present invention is not limited thereto, and each roller unit 25 may be a roller of a single member.

Obviously, numerous modifications and variations of the present invention are possible in light of the above teachings. It is therefore to be understood that within the scope of the appended claims, the present invention may be practiced otherwise than as specifically described herein.

What is claimed is:

1. A tripod-type constant velocity joint, comprising:

an outer joint member coaxially connected to a first rotation shaft and formed of a cylindrical tubular body having three guide grooves formed on an inner surface thereof at substantially equal circumferential intervals, the guide grooves extending parallel to a center axis of the tubular body;

an inner joint member coaxially connected to a second rotation shaft and having a boss portion, and three tripod shafts provided on the boss portion at substantially equal circumferential intervals and extending radially outward, each of the tripod shafts having a tripod spherical surface formed at a distal end portion thereof; and three-roller units each having a cylindrical center hole and a cylindrical surface formed on an outer periphery thereof and being coaxial with the center hole, the outer joint member, the inner joint member, and the three roller units being assembled together such that the roller units are rotatably supported on the corresponding tripod shafts of the inner joint member and received in the corresponding guide grooves of the outer joint member, wherein each of the guide grooves includes a pair of parallel elongated flat surfaces facing each other while sandwiching a first center plane including the center axis of the tubular body;

each roller unit is supported on the corresponding tripod shaft such that a wall surface of the center hole is slidably fitted on the corresponding tripod spherical surface, and the cylindrical surface is located between and in engagement with the pair of elongated flat surfaces of the corresponding guide groove such that only rolling along the center axis of the tubular body is permitted;

the outer periphery cylindrical surface of each roller unit has a width smaller than that of each roller unit;

and the radius, outer width, and inner width of the outer periphery cylindrical surface of each roller unit, and the radius of the center hole of each roller unit are determined to satisfy the following two inequalities:

$$0.5Rtc(1/\cos 0.3\Theta - 1) + (R1-R3)\mu < W1$$

$$1.5Rtc(1-\cos 0.3\Theta) + (R1-R3)\mu < W2$$

where

Rtc: the radius of a circle passing through the respective centers of the tripod spherical surfaces, $\Theta$: the maximum joint angle formed between the outer joint member and the inner joint member, R1: the radius of the outer periphery cylindrical surface of each roller unit, R3: the radius of the center hole of each roller unit, $\mu$: coefficient of friction between each tripod spherical surface and the wall surface of the center hole of the corresponding roller unit, W1: the outer width of the outer periphery cylindrical surface of each roller unit (the distance between a second center plane, which extends perpendicular to the first center plane and parallel to the center axis of the tubular body at a radial position separated from the center axis by the radius of the circle passing through the respective centers of the tripod spherical surfaces, and a side edge of the outer periphery cylindrical surface of the roller unit received in the corresponding guide groove, the side edge being located opposite the center axis), and W2: the inner width of the outer periphery cylindrical surface of each roller unit (the distance between the second center plane and a side edge of the outer periphery cylindrical surface of the roller unit, the side edge being located on the side toward the center axis), whereby a line of action of a force transmitted through a contact position between each tripod spherical surface and a wall surface of a corresponding center hole does not pass through a point outside a side edge of the cylindrical surface of the roller unit located opposite the center axis side.

2. A tripod-type constant velocity joint according to claim 1, wherein the radius, outer width, and inner width of the outer periphery cylindrical surface of each roller unit, and the radius of the center hole of each roller unit are determined to satisfy the following two inequalities:

$$W1<0.5Rtc(1/\cos\Theta-1)+(R1-R3)\mu$$

$$W2<1.5Rtc(1-\cos\Theta)+(R1-R3)\mu.$$

3. A tripod-type constant velocity joint according to claim 1, wherein the radius, outer width, and inner width of the outer periphery cylindrical surface of each roller unit, and the radius of the center hole of each roller unit are determined to satisfy an inequality $$0.5Rtc(1-\cos 0.3\Theta)+(R1-R3)\mu<W1$$

instead of the inequality $$0.5Rtc(1/\cos 0.3\Theta-1)+(R1-R3)\mu<W1.$$

4. A tripod-type constant velocity joint according to claim 2, wherein the radius, outer width, and inner width of the outer periphery cylindrical surface of each roller unit, and the radius of the center hole of each roller unit are determined to satisfy an inequality $$0.5Rtc(1-\cos 0.3\Theta)+(R1-R3)\mu<W1$$

and an inequality $$W1<0.5Rtc(1-\cos\Theta)+(R1-R3)\mu$$

instead of the inequality $$0.5Rtc(1/\cos 0.3\Theta-1)+(R1-R3)\mu<W1$$

and the inequality $$W1<0.5Rtc(1/\cos\Theta-1)+(R1-R3)\mu.$$

5. A tripod-type constant velocity joint according to claim 1, wherein each roller unit has a pair of taper surfaces which are formed at opposite side portions of the outer periphery cylindrical surface thereof so as to make the width of the cylindrical surface smaller than the width of the roller unit, and each guide groove has a pair of slant surfaces extending from opposite side edges of each of the elongated flat surfaces thereof, the slant surfaces coming into contact with portions of the taper surfaces of the corresponding roller unit, the portions being adjacent to the cylindrical surface, so as to restrict movement of the corresponding roller unit along the axial direction thereof.

6. A tripod-type constant velocity joint according to claim 1, wherein each roller unit is composed of an outer roller which has the cylindrical surface formed on the outer periphery thereof, and an inner ring which has the center hole and which is in engagement with an inner circumferential surface of the outer roller via rolling elements such that relative rotation of the inner ring is permitted but axial relative movement of the inner ring is restricted.

* * * * *

UNITED STATES PATENT AND TRADEMARK OFFICE
CERTIFICATE OF CORRECTION

PATENT NO.       : 7,544,131 B2                                      Page 1 of 1
APPLICATION NO.  : 11/234199
DATED            : June 9, 2009
INVENTOR(S)      : Ando et al.

It is certified that error appears in the above-identified patent and that said Letters Patent is hereby corrected as shown below:

On the title page, Item (73), the Assignee's information is incorrect. Item (73) should read:

Item -- (73) Assignee:   Toyoda Koki Kabushiki Kaisha,
                         Kariya-shi (JP) --

Signed and Sealed this

Eleventh Day of August, 2009

David J. Kappos
*Director of the United States Patent and Trademark Office*